(12) United States Patent
Kokawa

(10) Patent No.: US 6,662,826 B1
(45) Date of Patent: Dec. 16, 2003

(54) LIQUID METERING AND TRANSFER VALVE ASSEMBLY WITH PORT SWITCH

(75) Inventor: Hidesuke Kokawa, Sunnyvale, CA (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 10/065,348

(22) Filed: Oct. 7, 2002

(51) Int. Cl.[7] .............................................. F16K 11/074
(52) U.S. Cl. ................................... 137/597; 73/863.72
(58) Field of Search ........................... 137/597, 625.46; 73/863.72

(56) References Cited

U.S. PATENT DOCUMENTS

| | | |
|---|---|---|
| 3,964,513 A | 6/1976 | Molner |
| 4,068,528 A | 1/1978 | Gundelfinger |
| 4,152,391 A | 5/1979 | Cabrera |
| 4,346,610 A | 8/1982 | Ishii et al. |
| 4,445,391 A | 5/1984 | Cabrera |
| 4,506,558 A | 3/1985 | Bakalyar |
| 4,507,977 A | 4/1985 | Cabrera |
| 4,702,889 A | 10/1987 | Cabrera et al. |
| 4,726,237 A | 2/1988 | Yung |
| 4,726,932 A | 2/1988 | Feier et al. |
| 4,896,546 A | 1/1990 | Cabrera et al. |
| 4,948,565 A | 8/1990 | Bemis et al. |
| 4,957,008 A | 9/1990 | Proni et al. |
| 5,207,109 A | 5/1993 | Olsen |
| 5,251,670 A * | 10/1993 | Bates et al. ............ 137/625.46 |
| 5,390,552 A | 2/1995 | Demachi et al. |
| 5,437,200 A | 8/1995 | Hollinger |
| 5,524,496 A | 6/1996 | Nagai et al. |
| 5,542,305 A | 8/1996 | Hollinger |
| 5,601,115 A * | 2/1997 | Broerman ................... 137/595 |
| 5,650,577 A | 7/1997 | Nagai et al. |
| 5,763,795 A | 6/1998 | Tanaka et al. |
| 5,803,117 A | 9/1998 | Olsen et al. |

FOREIGN PATENT DOCUMENTS

| | | |
|---|---|---|
| DE | 198 41 782 A1 | 9/1998 |
| EP | 0 508 749 A2 | 4/1992 |
| EP | 0 784 204 A1 | 12/1996 |

* cited by examiner

Primary Examiner—John Fox
(74) Attorney, Agent, or Firm—Michael R. Crabb

(57) ABSTRACT

A multi-disc liquid metering and transfer valve includes a port switch valve disc that has at least two inlet connections. Each of the connections is coupled to different fluid samples, such as blood. The remaining discs of the valve are used to provide measured samples that can be selectively routed to mixing chambers by pumped diluent reagents. The port valve switch can be rotated about its axis to select a desired inlet connection.

15 Claims, 7 Drawing Sheets

LIQUID METERING AND TRANSFER VALVE ASSEMBLY WITH PORT SWITCH

BACKGROUND OF INVENTION

The present invention relates generally to liquid transfer systems and in particular the present invention relates to liquid transfer valves for measuring and dispensing precise volumes of samples in a hematology or blood analyzer.

Liquid transfer valves have been used to measure and dispense precise microliter volumes of samples. One type of transfer valve is a rotary operating type having a pair of measuring chambers established in a series coupled relationship which is capable of providing simultaneously a pair of precisely measured, different liquid volumes and directing each to a pair of different predetermined locations, each along with a respective known volume of diluent.

U.S. Pat. No. 4,507,977 issued Apr. 2, 1985 describes a rotary valve assembly comprising a pair of stationary outer disc members and a rotary inner disc sandwiched therebetween and engaged with the interior faces of both outer discs. A hollow external loop is secured to one of the outer discs and a segmenting passageway is provided in the inner disc and constitutes a first measuring chamber. The loop secured to the outer disc constitutes a second measuring chamber. The valve assembly operates between two conditions, load and delivery. The valve assembly has a single sample input connection that is coupled to an external switch. The external switch allows for the selection of either a first or second sample.

The external switch can be designed in different configurations. For example, a hematology analyzer called Advia manufactured by Bayer uses a rotary 3-way valve to switch two sample inlet ports. External switches often require excess amounts of blood samples, which can be critical for baby blood samples. As an alternative to the rotary valves, a CD3500 blood analyzer manufactured by Abbott Laboratories uses two pinch valves to switch between two sample fluids. While reducing sample volumes, this system may cause the analyzer to carry air bubbles inside of the blood sample. Additional examples are provided in Sysmex hematology analyzers SF-3000 and XE-2100, which have duplicated shearing holes on one set of sample shearing valves and one sample probe directly attached to one of the three valves to avoid having an external switching valve. Such valve systems make instrumentation complicated due to the necessity to double (×2) associated valves around the sample shearing valve.

For the reasons stated above, and for other reasons stated below which will become apparent to those skilled in the art upon reading and understanding the present specification, there is a need in the art for a liquid metering and transfer valve that reduces sample volume and external sample switching. The above-mentioned problems with liquid metering and transfer valves and other problems are addressed by the present invention and will be understood by reading and studying the following specification.

SUMMARY OF INVENTION

In one embodiment, a liquid metering and transfer valve assembly comprises first and second stationary valves and a rotatable inner valve sandwiched between the first and second valves. The inner valve has opposite surfaces sealingly engaged with adjacent surfaces of the first and second valves. A rotatable port switch is located adjacent to the first valve, such that the first valve is sandwiched between the inner valve and the port switch. The port switch has a surface sealingly engaged with an adjacent surface of the first valve, wherein the port switch comprises first and second input connections to receive externally provided fluids.

DETAILED DESCRIPTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Embodiments of the present invention provide a liquid diluting valve assembly for delivering separate volumes of a primary sample with predetermined secondary volumes of diluting reagents to different locations for the purpose of creating accurate and precise dilutions of the primary sample. The valve assembly incorporates an input port switch to connect two different primary sample sources to the valve assembly. The port switch is part of the valve assembly and eliminates the external sample fluid switches of prior systems.

In one embodiment, the valve assembly includes four independent discs that are assembled in a predetermined manner whereas flat contacting surfaces of the discs form a sealed valve unit by the application of frictional force and wetted disc surfaces. The discs have a central axial passage aligned to accommodate a spindle, or axle rod, with the discs arranged in the following order: port switch disc, front disc, center disc and a rear disc.

Figure 1:
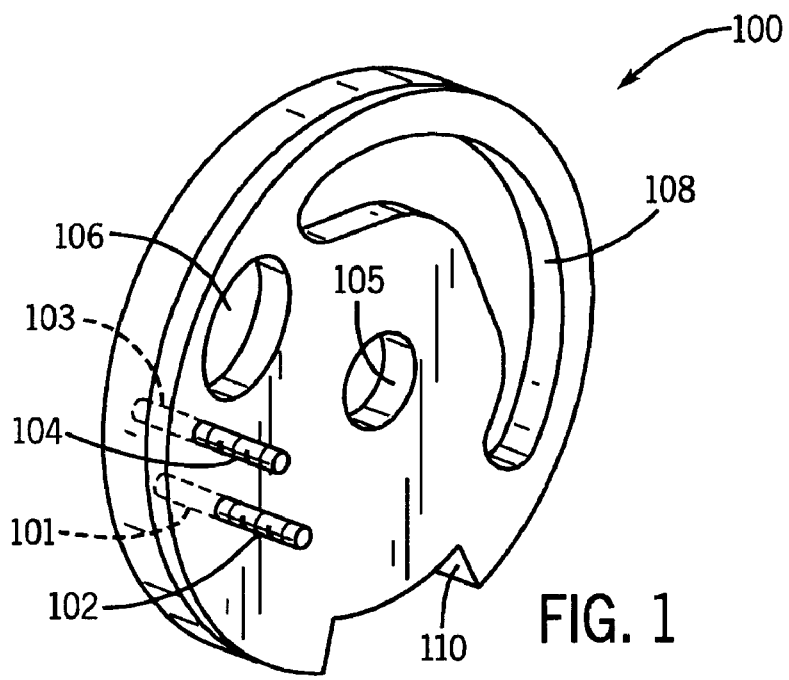
FIG. 1 is a perspective view of a port switch of an embodiment of the present invention.

Referring to FIG. 1, a detailed description of an embodiment of the port switch is provided. The port switch is defined by a port switch disc 100 that includes first 102 and second 104 sample input connections (ports). These connections can be male or female type connections for fluid communication with a tube, or the like. The input connections provide, or are connected to, respective chambers or passages 101, 103 through the port switch disc. An axial opening 105 is provided to receive the axle rod. In one embodiment, the port switch disc is attached to the axle rod (not shown in FIG. 1) to allow rotation of the port switch by rotating the rod. The port switch can be attached using a mating feature, such as a pin, flat surface, or key. Alternatively, the port switch can be press-fit onto the axle rod.

Figure 8:
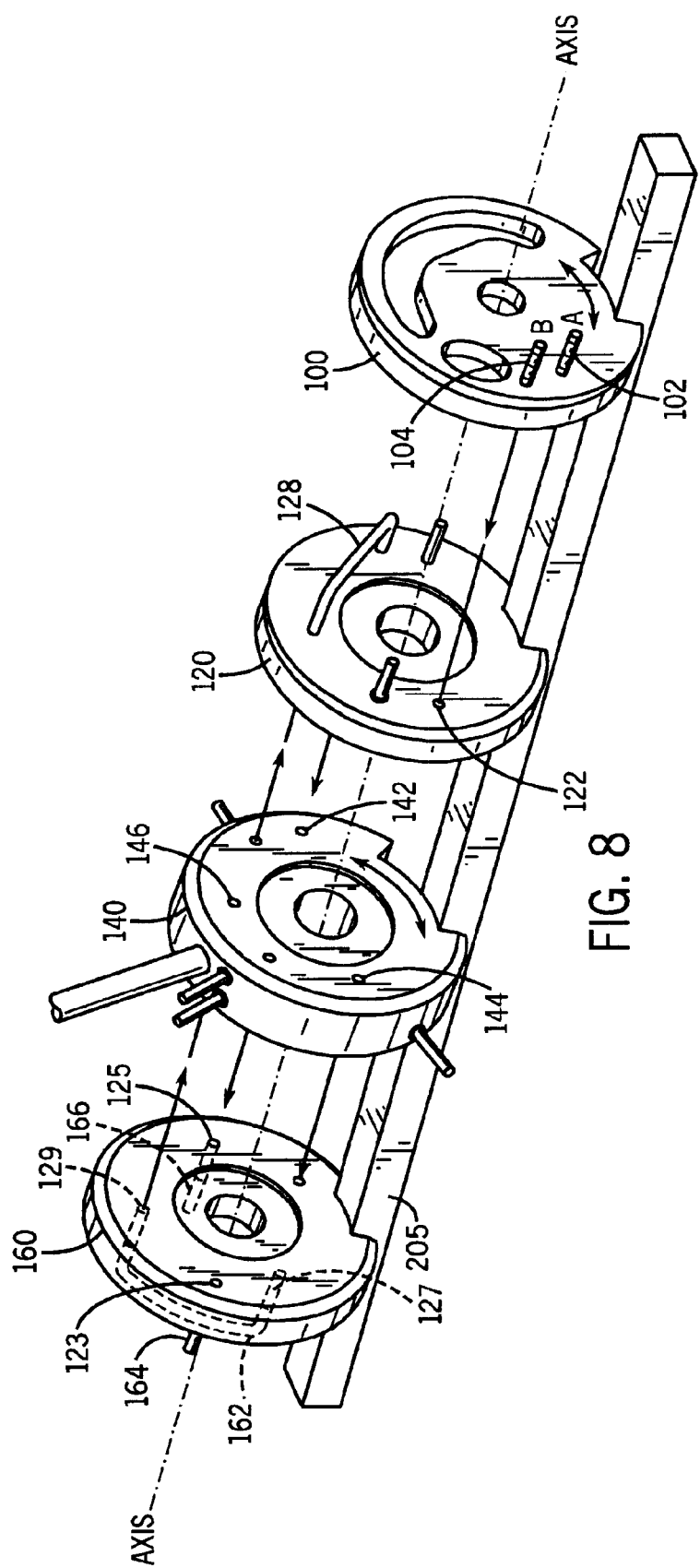
FIG. 8 is an exploded view of the valve discs and port switch during fluid processing.

A notch 110 provided in the periphery of the disc 100 can be provided to control the rotational distance of the port switch in combination with a stop bar 205 (see FIG. 8). Other stop features known to those skilled in the art can be used to control the rotation position, such as integral teeth or an external stepper motor. Further, the stop feature can be incorporated in the axle rod movement. In one embodiment, the port switch can rotate through a 15-degree arc.

Figure 2:
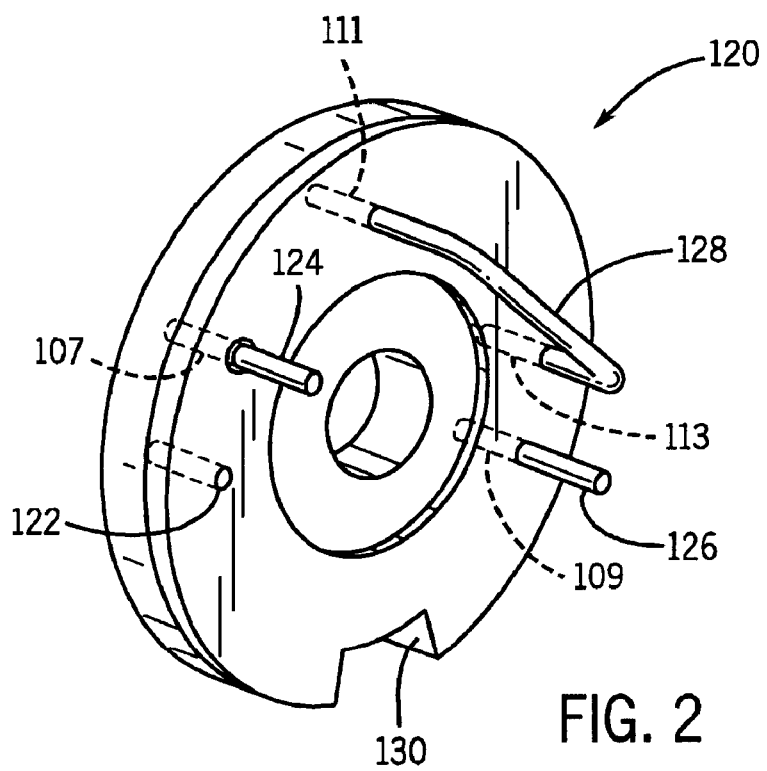
FIG. 2 is a perspective view of a front valve disc of an embodiment of the present invention.

Referring to FIG. 2, a detailed description of an embodiment of the front fixed disc 120 is provided. The front disc 120, which is also referred to as the first disc, valve, or valve disc, includes passage 122 that extends through the disc. Similarly, first 124 and second 126 connections are provided to communicate with external fluid sources. These connections can be male or female type connections for fluid communication with a tube, or the like. The connections provide, or are connected to, respective chambers or passages 107, 109 through the front disc. A tube 128 provided in a closed loop is coupled to the front disc 120. The ends of the loop are connected to respective chambers or passages 111, 113 that extend through the first disc. That is, a fluid can enter the back of the first disc, pass through the loop and exit the back of the first disc. When assembled, connections 124 and 126, and the loop 128 tube pass through clearance openings 106 and 108 of the port disc switch 100.

Figure 3:
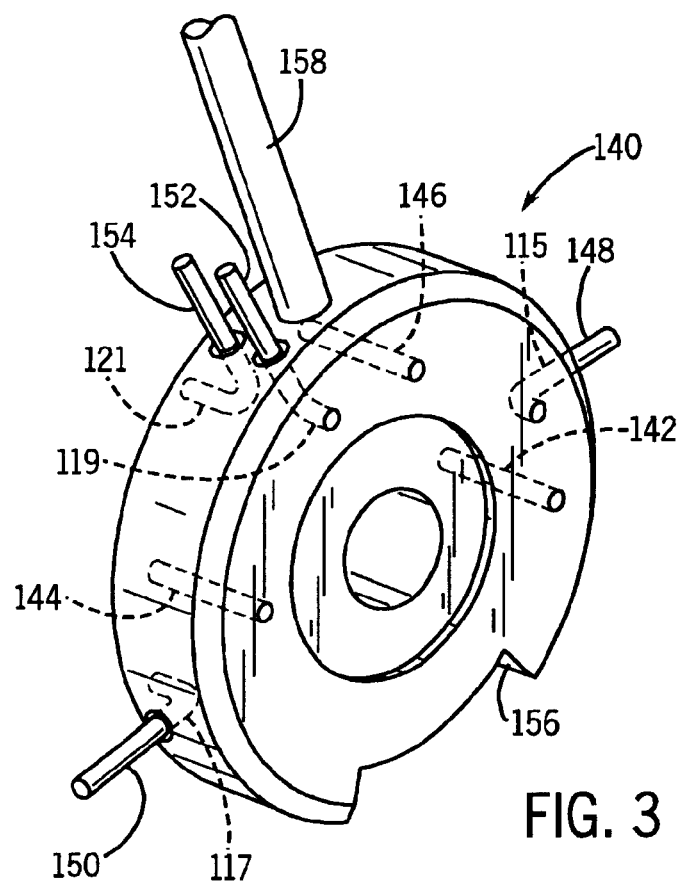
FIG. 3 is a perspective view of a center valve disc of an embodiment of the present invention.

Referring to FIG. 3, a detailed description of an embodiment of the center rotational disc 140 is provided. The center disc includes three chambers 142, 144 and 146 that pass through the center disc and provide fluid paths from the front disc 120 to a back disc 160 (see FIG. 4). The center disc also includes four connections 148, 150, 152 and 154 to communicate with external fluid sources or mixing chambers. Again, these connections can be male or female type connections for fluid communication with a tube, or the like. The connections provide selected communication with either the front or rear disc via respective internal passages 115, 117, 119, 121 as shown. A rotation arm 158 radially extends from the center disc 140 and allows for selected rotation of the center disc using an external motor, pneumatic piston, or the like (see FIG. 5). In one embodiment, the center disc 140 can rotate through a 30-degree arc.

Figure 4:
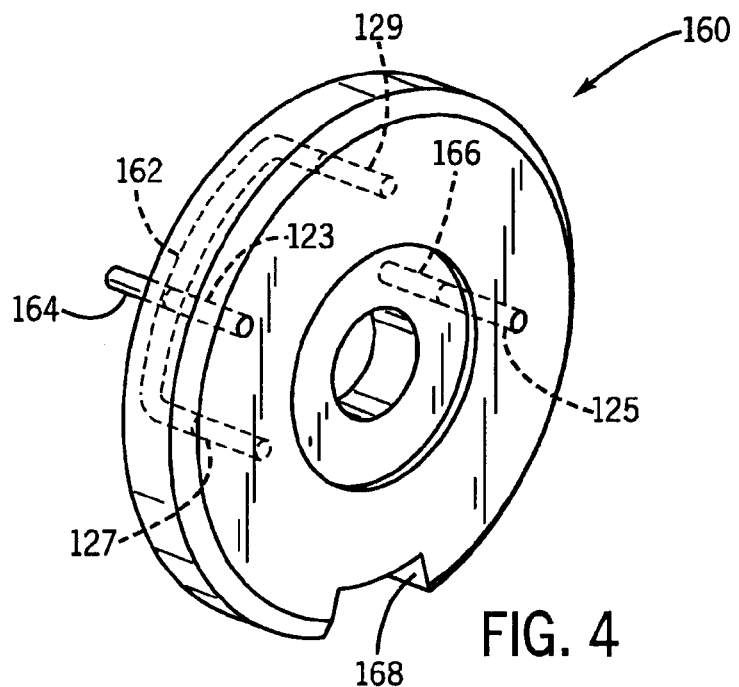
FIG. 4 is a perspective view of a rear valve disc of an embodiment of the present invention.

The rear disc 160, which is also referred to herein as the second disc, valve or valve disc, is illustrated in FIG. 4. The rear disc 160 includes two passages 123, 125 coupled to external connections 164 and 166. These connections can be male or female type connections for fluid communication with a tube, or the like. A tube 162 is provided as a closed loop, where the ends of the loop are connected to respective chambers 127, 129 that extend through the rear disc 160. That is, a fluid can enter the front of the rear disc, pass through the loop and exit the front of the rear disc.

Figure 7:
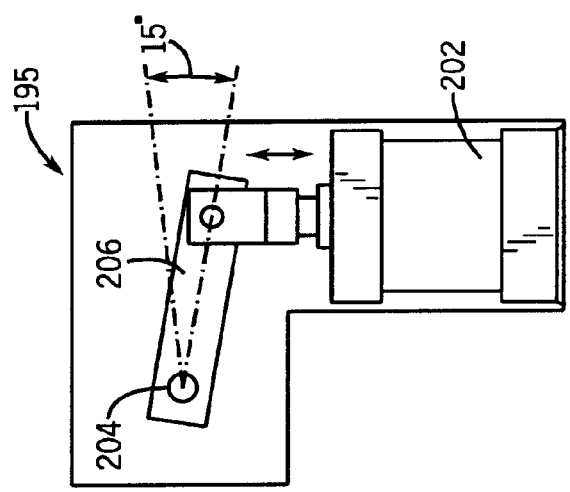
FIG. 7 is a rear view of the metering and transfer valve assembly of FIG. 5.
Figure 6:
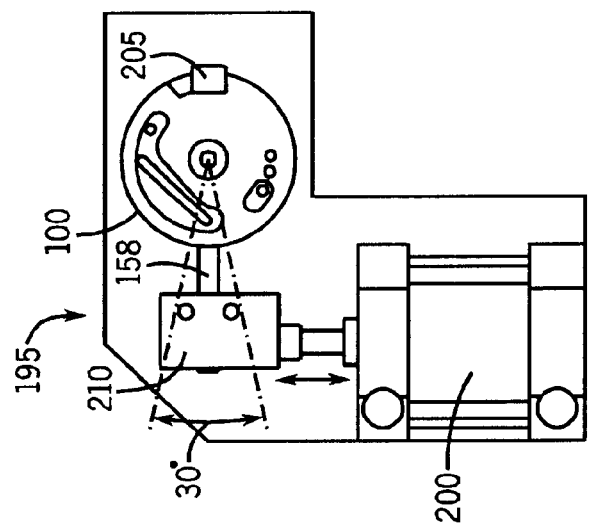
FIG. 6 is a front view of the metering and transfer valve assembly of FIG. 5.
Figure 5:
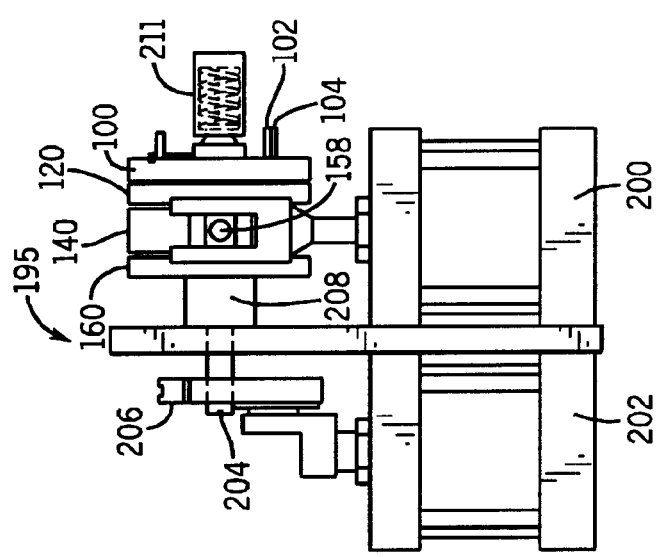
FIG. 5 is a top view of a metering and transfer valve assembly of an embodiment of the present invention.

Referring to FIGS. 5 to 7, an embodiment of the liquid metering and transfer valve 195 of this invention is described. FIG. 5 is a top view of the assembled valve, FIG. 6 is a front view of the assembled valve, and FIG. 7 is a rear view of the assembled valve. The port switch 100, front disc 120, center disc 140 and rear disc 160 are sandwiched together on an axle rod 204. As explained above, the port switch disc 100 is attached to the rod 204 so that disc 100 and rod 204 move as a single unit. Two pneumatic pistons 200 and 202 are provided to rotate the center disc 140 and the axle rod 204, respectively. The first piston 202 is connected to the axle rod 204 via a leverage arm 206 to allow for movement of the port switch 100. The second piston 200 provides a push/pull motion to the rotation arm 158 of the center disc 140. As illustrated in FIG. 6, the second piston is coupled to the rotation arm 158 via a coupling 210. The coupling 210 can have any design that allows for pushing and pulling of the rotation rod 204, and is not limited to the illustrated design.

The four discs 100, 120, 140, 160 are sandwiched between an axle collar 208 and a spring-loaded fastener 211. A stop rod or bar 205 is provided to keep the front and rear discs 120, 160 stationary and provide rotation stops for the port switch disc 100 and the center disc 140. As explained above, the port switch disc 100 and the center disc 140 are capable of independent movement about the central axis whereas the front disc 120 and rear disc 160 are always held in a fixed position. The port switch disc 100 has two supply connections 102 and 104 that connectable respectively to two independent external sources of primary fluid samples, such as blood in vials by a pair of conventional aspirator probes. For example, supply connection 102 can be connected to a conventional manual operated aspirator probe with which the operator draws the blood from an open vial or test tube, and supply connection 104 can be connected to a conventional automatic (machine controlled) aspirator probe that a hematology analyzer uses to penetrate a stopper of a closed sample and contact the sample fluid.

The port switch disc 100 is rotationally indexed to connect to a primary sample source with the remaining valve assembly disc components positioned to aspirate the primary sample, in a serial manner, through the valve internal passages and loops 122, 144, 127, 162, 129, 146, 111, 128, 113, 142, 125, 166. Once the primary sample is pumped throughout the serial passages of the valve assembly, the center disc 140 is rotated to isolate fixed volumes or "segments" of primary sample within the portions of the valve assembly. With the center disc 140 rotated, connections to external diluting reagents and external destinations for both primary and secondary liquids are provided.

Referring to FIGS. 8 to 11, four process operations are described to better understand the valve assembly. The four process operations include a sample aspiration (load), and three sample dilution operations (delivery). FIG. 8 illustrates a sample aspiration operation. As a preliminary step, the port switch disc 100 can be indexed to rotate clockwise to select sample "A" or counter-clockwise to select sample "B". That is, either port 102 or port 104 is aligned with the input passage 122 of the front disc 120. Typically the port switch disc 100 is indexed infrequently, perhaps only a few times per day, when the operator wants to switch between manual and automatic aspiration probes or modes. However, the center disc 140 is indexed between its clockwise (FIG. 8) and counter-clockwise (FIGS. 9–11) positions frequently as described below to aspirate a sample and carryout various operations on the sample. To aspirate or load the sample fluid the center disc 140 is moved into the counter clockwise position shown. As a result the input passage 122 of the front disc is aligned with passage 144 of the center disc 140. With the center disc 140 in this position passage 144 is also aligned with the bottom passage 127 associated with the loop 162 of the rear disc 160. The top passage 129 associated with loop 162 is aligned with passage 146 of the center disc 140 and the top passage 111 associated with external loop 128 of the front disc 120. The bottom passage 113 associated with the front disc loop 128 is aligned with connection 166 of the rear disc, through the center disc passage 142. As such, a fluid path (designated by the bold arrows in FIG. 8) is defined through the discs 100, 120, 140, 160 and a sample fluid, such as blood, is pumped from either input port 102 or 104 through the center disc 140 and fills the loops 128, 162 of the front and rear discs 120, 140.

Figure 9:
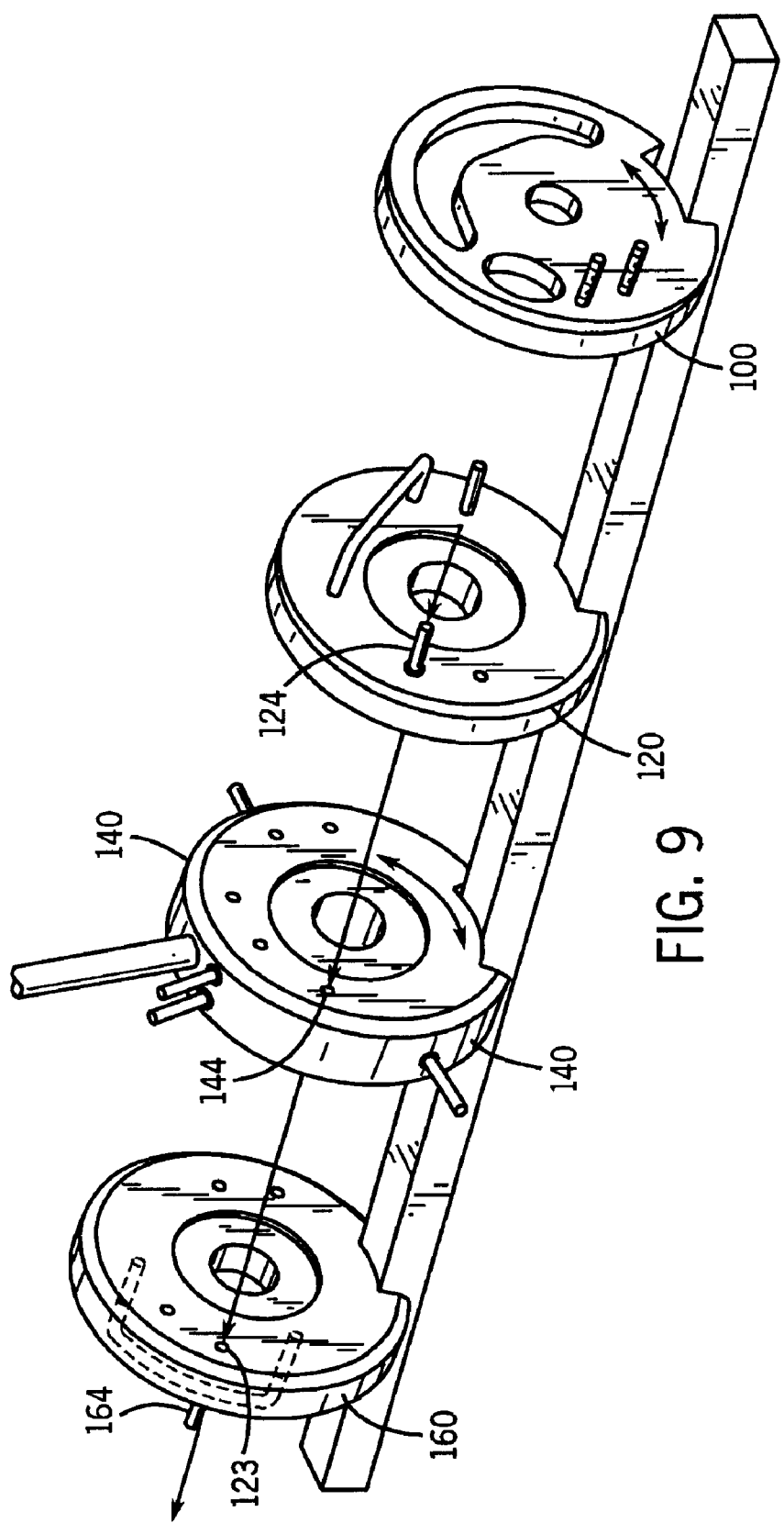
FIG. 9 is an exploded view of the valve discs and port switch during fluid processing.

As illustrate in FIG. 9, the center disc 140 is rotated clockwise until limited by the stop bar 205 to further process segments of the aspirated fluid sample, i.e.—dilute or deliver it. By moving the center disc 140 blockages or discontinuities in the sample fluid path are formed, but new transport paths are created. In this position, chamber 144 of the center disc is aligned or fluidly connected with connection 124 of the front disc 120 and connection 164 of the rear disc 160 through passage 123. The chamber 144 of the center disc 140 contains previously aspirated accurate micro-volume of sample, such as a 5-uL aliquot of blood. A red blood cell ("RBC") diluent reagent is transported through connection 124 of the front disc. A RBC mixing chamber (not shown) is coupled to the connection 164 of the rear disc. RBC diluent is then pumped from connection 124 to connection 164 producing a precise RBC dilution in the RBC mixing chamber.

Figure 10:
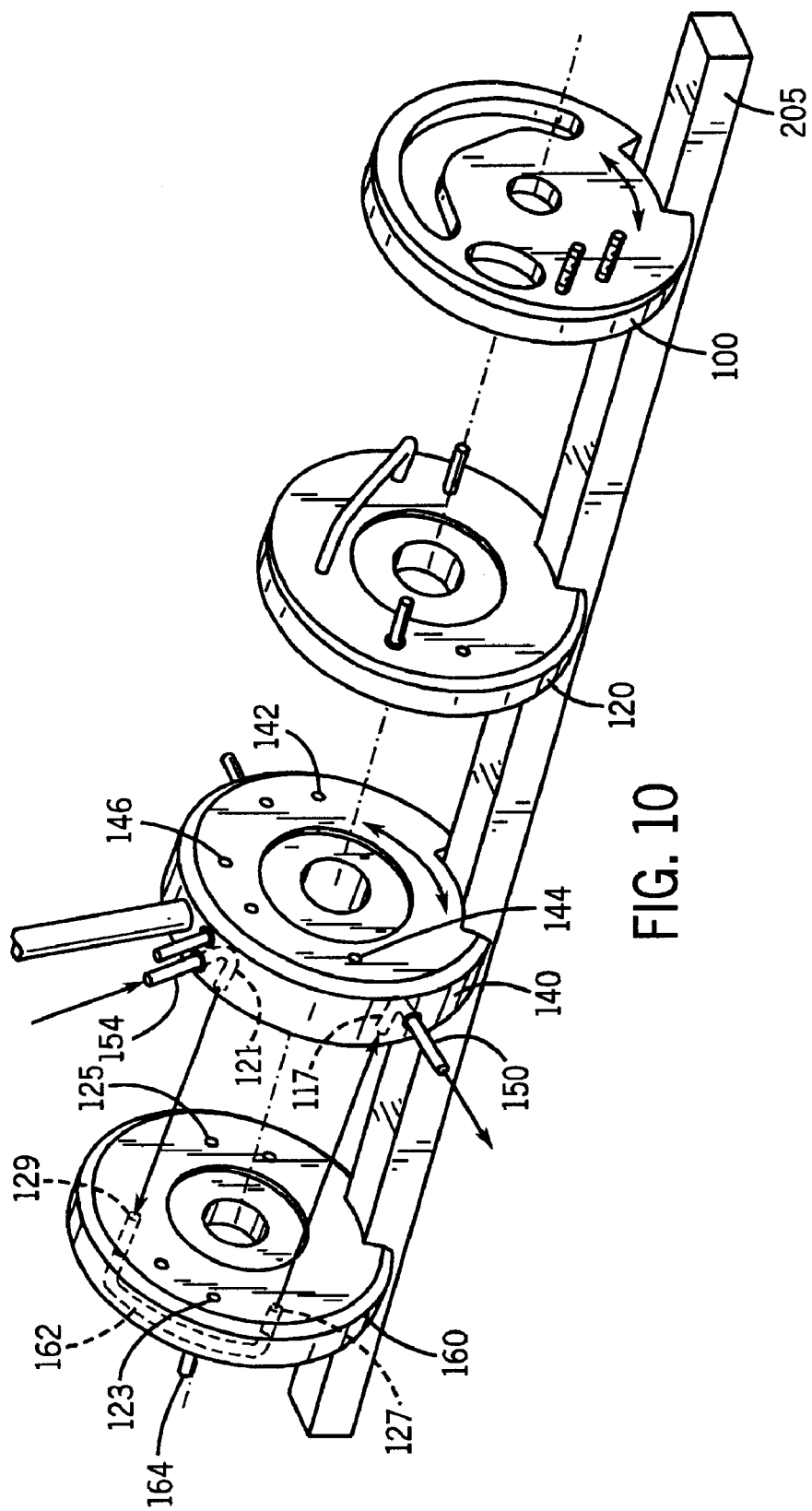
FIG. 10 is an exploded view of the valve discs and port switch during fluid processing.

A second sample dilution and delivery operation is illustrated in FIG. 10. With the center disc 140 rotated clockwise the passages 127, 129 associated with the rear disc loop 162 are also aligned, or in fluid communication with the passages 117, 121 and connections 150 and 154 of the center disc. An accurate micro-volume of blood sample has previously been aspirated and isolated within the rear disc loop 162. In one embodiment the loop 162 and passages 127, 129 provide a 30-uL aliquot of blood. A white blood cell ("WBC") diluent reagent is pumped through connection 154 of the center disc 140 to a WBC mixing chamber (not shown) coupled to connection 150 of the center disc 140 to produce a precise WBC dilution in the WBC mixing chamber.

Figure 11:
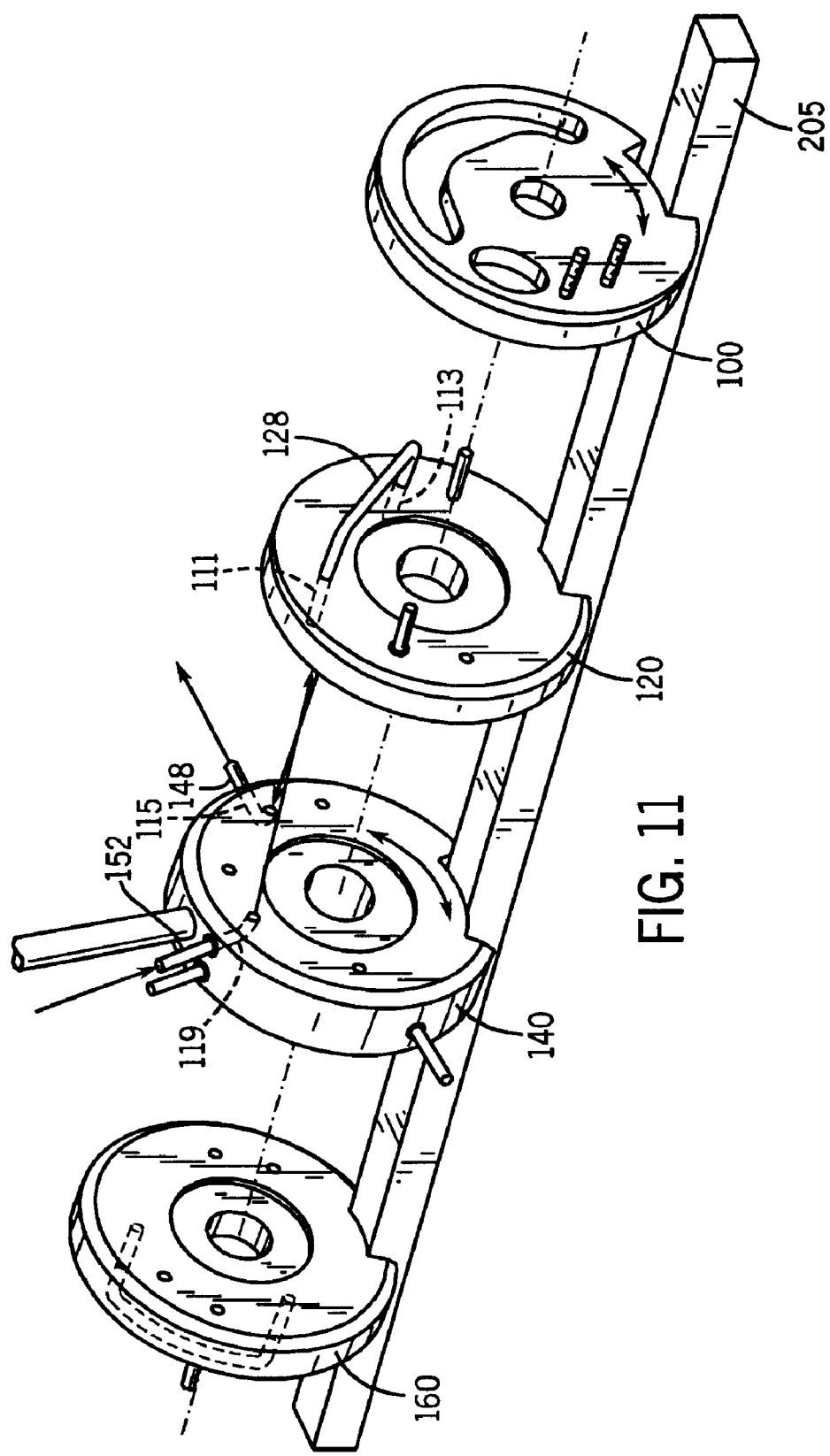
FIG. 11 is an exploded view of the valve discs and port switch during fluid processing.

A third sample dilution and delivery operation is illustrated in FIG. 11. With the center disc 140 rotated clockwise passages 111, 113 associated with the front disc loop 128 are also aligned or in fluid communication with passages 115, 119 associated with connections 148 and 152 of the center disc. An accurate micro-volume of blood sample has been previously isolated within the front disc loop 128 and passages 111, 113. In one embodiment the loop 128 and passages 111, 113 provide a 30-uL aliquot of blood. A hemoglobin ("HGB") diluent reagent is pumped through connection 152 of the center disc to a HGB mixing chamber (not shown) coupled to connection 148 of the center disc to produce a precise HGB dilution in the HGB mixing chamber.

The above liquid metering and transfer valve assembly allows for delivering a plurality of separate volumes of a primary sample, each with predetermined secondary volumes of diluting liquids to different locations for the purpose of creating accurate and precise dilutions of the primary sample. The valve assembly incorporates an input port switch to connect two different primary sample sources to the valve assembly. The port switch is an integral part of the valve assembly, mounted on the same axle rod and preferably limited by the same stop rod, which provides a compact assembly and eliminates the external sample fluid switches of prior systems.

Embodiments of the present invention comprise four valves discs, which include a port switch valve disc that has at least two inlet connections. Each of the inlet connections are coupled to different samples, such as manually operated open vial sampling probe and automatic closed vial sampling probe. The remaining discs are used to provide measured samples that can be selectively routed to mixing chambers by pumped diluent reagents.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A liquid metering and transfer valve assembly comprising:

first and second stationary valves;

a rotatable inner valve sandwiched between the first and second valves, wherein the inner valve has opposite surfaces sealingly engaged with adjacent surfaces of the first and second valves; and a rotatable port switch located adjacent to the first valve, such that the first valve is sandwiched between the inner valve and the port switch, the port switch has a surface sealingly engaged with an adjacent surface of the first valve, wherein the port switch comprises first and second input connections to receive externally provided fluids.

2. The liquid metering and transfer valve assembly of claim 1 wherein the first and second valves and the inner valve comprise fluid passages, wherein the fluid passages can be selectively aligned to meter and transfer fluids.

3. The liquid metering and transfer valve assembly of claim 1 wherein the first valve, second valve, inner valve and the port switch are axially aligned, and an axle rod traverses through the first valve, second valve, inner valve and the port switch.

4. The liquid metering and transfer valve assembly of claim 3 wherein the port switch is coupled to the axle rod in a fixed manner such that the port switch rotates about its axis in response to rotation of the axle rod.

5. The liquid metering and transfer valve assembly of claim 1 wherein the first and second input connections are male-type connections.

6. A liquid metering and transfer valve assembly comprising: first and second stationary valve discs;

a rotatable inner valve disc sandwiched between the first and second valve discss, wherein the inner valve has opposite surfaces engaged with adjacent surfaces of the first and second valve discs;

a rotatable port switch disc located adjacent to the first valve disc such that the first valve disc is sandwiched between the inner valve disc and the port switch disc, the port switch disc has a surface engaged with an adjacent surface of the first valve disc, and wherein the port switch disc comprises first and second input connections to receive externally provided first and second fluids and selectively transport either the first or second fluid to the first valve disc; and an axle rod traversing through the first valve disc, second valve disc, inner valve disc and the port switch disc, the port switch disc is coupled to the axle rod in a fixed manner such that the port switch disc rotates about its axis in response to rotation of the axle rod.

7. The liquid metering and transfer valve assembly of claim 6 further comprising a controllable motion device coupled to the axle rod to selectively rotate the axle rod.

8. The liquid metering and transfer valve assembly of claim 7 wherein the controllable motion device is a pneumatic piston coupled to the axle rod by a leverage arm.

9. The liquid metering and transfer valve assembly of claim 6 further comprising a controllable motion device coupled to the rotatable inner valve disc.

10. The liquid metering and transfer valve assembly of claim 9 wherein the controllable motion device is a pneumatic piston coupled to the rotatable inner valve disc.

11. The liquid metering and transfer valve assembly of claim 6 wherein the rotatable port switch disc comprises a rotational stop feature to prohibit rotation of the rotatable port switch disc outside of a predetermined arc.

12. The liquid metering and transfer valve assembly of claim 11 wherein the predetermined arc is 15 degrees.

13. The liquid metering and transfer valve assembly of claim 6 wherein the rotatable inner valve disc comprises a rotational stop feature to prohibit rotation of the rotatable inner valve disc outside of a predetermined arc.

14. The liquid metering and transfer valve assembly of claim 13 wherein the predetermined arc is 30 degrees.

15. The liquid metering and transfer valve assembly of claim 6 further comprising a compression device coupled to the axle rod to provide a compression force to the port switch disc such that the first valve disc, second valve disc, inner valve disc and the port switch disc are held in frictional contact.

* * * * *